(12) United States Patent
Arita

(10) Patent No.: US 8,579,297 B2
(45) Date of Patent: Nov. 12, 2013

(54) SHAFT SEAL DEVICE

(75) Inventor: Yasuhisa Arita, Tokyo (JP)

(73) Assignee: Eagle Industry Co., Ltd. (JP)

( * ) Notice: Subject to any disclaimer, the term of this patent is extended or adjusted under 35 U.S.C. 154(b) by 0 days.

(21) Appl. No.: 13/636,311

(22) PCT Filed: Nov. 10, 2010

(86) PCT No.: PCT/JP2010/069972
§ 371 (c)(1),
(2), (4) Date: Sep. 20, 2012

(87) PCT Pub. No.: WO2012/032678
PCT Pub. Date: Mar. 15, 2012

(65) Prior Publication Data
US 2013/0154200 A1    Jun. 20, 2013

(30) Foreign Application Priority Data
Sep. 11, 2010    (JP) .................. 2010-203801

(51) Int. Cl.
*F16J 15/02*    (2006.01)
(52) U.S. Cl.
USPC .......................................... 277/551; 277/575
(58) Field of Classification Search
USPC ............... 277/353, 551, 572–577, 925
See application file for complete search history.

(56) References Cited

U.S. PATENT DOCUMENTS

| 2,766,082 | A | * | 10/1956 | Ritchey | 277/370 |
| 6,921,083 | B2 | | 7/2005 | Yasui et al. | 277/572 |
| 7,431,304 | B2 | * | 10/2008 | Dahlheimer | 277/370 |
| 7,513,506 | B2 | | 4/2009 | Kondo et al. | 277/353 |
| 7,717,432 | B2 | | 5/2010 | Kondo et al. | 277/353 |
| 7,753,376 | B2 | | 7/2010 | Kondo et al. | 277/353 |
| 8,256,772 | B2 | | 9/2012 | Itadani et al. | 277/353 |
| 2003/0062690 | A1 | | 4/2003 | Yasui et al. | 277/549 |
| 2007/0222157 | A1 | | 9/2007 | Kondo et al. | 277/345 |
| 2009/0166981 | A1 | | 7/2009 | Kondo et al. | 277/549 |
| 2009/0166982 | A1 | | 7/2009 | Kondo et al. | 277/549 |

FOREIGN PATENT DOCUMENTS

| JP | 2-143567 | 12/1990 | ............... F16J 15/32 |
| JP | 2003-113947 | 4/2003 | ............... F16J 15/32 |
| JP | 2005-320935 | 11/2005 | ............... F02M 59/44 |
| WO | WO 2010/061670 | 6/2010 | ............... F16J 15/32 |

OTHER PUBLICATIONS

International Search Report dated Nov. 30, 2010 for PCT/JP2010/069972, with translation, 4 pgs.
International Preliminary Report on Patentability issued in corresponding application No. PCT/JP2010/069972, issued Apr. 9, 2013 (5 pgs).

* cited by examiner

*Primary Examiner* — Vishal Patel
*Assistant Examiner* — Christine M Mills
(74) *Attorney, Agent, or Firm* — Hayes Soloway P.C.

(57) ABSTRACT

A shaft seal device is provided in which movement of the seal lip is prevented and the sealing function can be reliably maintained by shaping the adapter so that the adapter is more readily pressed into and less liable to be dislodged from the cartridge, and by increasing the width in the radial direction. An external peripheral-side flange of the adapter fitted into the cartridge on the sealing fluid side of the first lip seal member is formed in a small-diameter tapered shape toward the web side, and the web is composed of an external-periphery-side portion having an orthogonal planar shape that is orthogonal to the center of the shaft, and a tapered internal-periphery-side portion that slopes to the sealing fluid side.

4 Claims, 6 Drawing Sheets

Prior Art

SHAFT SEAL DEVICE

TECHNICAL FIELD

The present invention relates to a shaft seal device for sealing a space between a housing and a rotating shaft, and particularly relates to a lip seal-type shaft seal device for sealing the space between the rotating shaft and the housing of an automotive water pump, a water pump for a home electric appliance, a light-load commercial-grade water pump, or the like.

BACKGROUND ART

The shaft seal device shown in FIG. 6 is a known as a conventional lip seal-type shaft seal device (hereinafter referred to as "prior art;" e.g., see Patent Document 1).

The shaft seal device of the prior art has a cartridge 62 fitted into the internal periphery of a shaft hole 61 of a housing 60; a first seal lip 63 made of rubber material fitted onto the cartridge 62 in a non-bonded state; a case 64 fitted onto the first seal lip 63 in a non-bonded state; a second seal lip 65 made of resin material crimped onto and held by the case 64 and a backup ring 66 for supporting the second seal lip; and an adapter 67 fitted onto the cartridge 62 on a sealing fluid side L of the first seal lip 63.

The adapter 67 in the shaft seal device of the prior art has a cross-sectional shape that is substantially the shape of the letter "c," and has a cylindrical external peripheral flange 68 that is formed parallel to the axial center, as shown in FIG. 6. The adapter 67 cannot be fitted into the cartridge 62 when the diameter of the external peripheral flange 68 is excessively greater than the inside diameter of a cylindrical part 69 of the cartridge 62, and conversely, the adapter readily dislodges from the cartridge when the inside diameter is excessively small. Therefore, the adapter 67 must be manufactured with rigorous dimensional precision.

There are cases in which the housing 60 is not modified and only the diameter of a shaft 70 is modified to, e.g., 12 mm to 8 mm. In such a case, the inside diameter dimension of the first seal lip 63, the case 64, the second seal lip 65, the backup ring 66, and other members must be reduced in correspondence to the diameter of the shaft 70, and the width of the first seal lip 63 and the like in the radial direction is increased. There is accordingly a problem in that when the adapter 67 shown in FIG. 6 is used in an unmodified manner, the portion pressed by the adapter 67 on a sealing fluid side L of the first seal lip 63 is narrowed, and when the assembly is set on the shaft 70, the first seal lip 63 moves in the shaft insertion direction and a gap is formed between the first seal lip 63 and the case 64. When an attempt is made to reduce the inside diameter dimension of the adapter 67 and to increase the width in the radial direction in order to adapt to such a problem, the first seal lip 63 is compressed by the adapter 67 to the atmosphere side A because the internal peripheral side of the adapter is attached so as to slightly slope to the atmosphere side when the adapter 67 is press-fitted to the cartridge 62, and there is a problem in that the inside diameter dimension of the first seal lip 63 changes and the seal function is negatively affected. Accordingly, the inside diameter dimension of the adapter 67 cannot be reduced to increase the width in the radial direction.

FIGS. 5(a) and 5(b) show experimental results for the case in which the adapter 67 of the prior art shown in FIG. 6 is used in a shaft seal device having a small shaft diameter. It is apparent that the width of the adapter 67 in the radial direction is small, the lip part of the first seal lip 63 is pulled by the shaft 70 to the sealing fluid side L, a gap 69 is formed between the first seal lip 63 and the case 64, and the first seal lip 63 is moved by assembly onto the shaft 70 when the adapter is assembled onto the shaft 70 of FIG. 5(a). On the other hand, FIG. 5(b) shows a state in which assembly has been completed and system pressure is applied to the sealing fluid side L, and it is apparent that the first seal lip 63 and the case 64 are brought into contact with each other due to the pressure, and the first seal lip 63 is moved by the system pressure in the direction of the atmosphere side A.

In this manner, in the shaft seal device of the prior art, the seal lip readily moves under the effect of assembly onto the shaft 70 and system pressure, and this becomes a cause of reduced sealing performance.

PRIOR ART DOCUMENTS

Patent Documents

Patent Document 1: WO 2010/061670 Pamphlet

DISCLOSURE OF THE INVENTION

Problems to be Solved by the Invention

The present invention was devised in order to solve the problems of prior art described above, and an object thereof is to provide a shaft seal device that can prevent movement of the seal lip and reliably maintain sealing function by making the shape of the adapter, firstly, to be more readily pressed into and less liable to dislodge from the cartridge, and secondly, to have a greater diameter in the radial direction without a negatively effect on the sealing function.

Means for Solving the Problems

In order to achieve the objects described above, the shaft seal device of a first aspect of the present invention is a shaft seal device for sealing a space between a housing and a rotating shaft, the shaft seal device characterized in comprising: a cartridge fitted into the internal periphery of a shaft hole of the housing; a first lip seal member fitted in a non-bonded state to the cartridge; a case fitted in a non-bonded state to the first lip seal member; a second lip seal member crimped onto and held by the case, and a backup ring for supporting the second lip seal member; and an adapter fitted into the cartridge on a sealing fluid side of the first lip seal member, wherein the adapter is annular in overall shape with a cross-sectional shape that is substantially the shape of the letter "c," and has an external peripheral flange in contact with an internal peripheral surface of the cartridge and an internal peripheral flange and web for pressing the first lip seal member; and the external peripheral flange has a tapered shape that decreases in diameter toward the web side, a distal end part of the outside diameter side describing an acute angle, and being formed to a diameter that is greater than the diameter of the internal peripheral surface of the cartridge.

In accordance with the first aspect, the adapter can be smoothly fitted into the internal peripheral surface of the cartridge when fitting is carried out. Also, when the adapter has been fitted, the adapter is less liable to dislodge from the cartridge. Therefore, the movement of the seal lip of the first lip seal member can be prevented, sealing performance can be reliably maintained.

Furthermore, the adapter can be readily fabricated because slight dimensional variability is absorbed by elastic deformation of the external peripheral-side flange without the need to fabricate the adapter with rigorous dimensional precision.

The shaft seal device of a second aspect is the shaft seal device of the first aspect, and is characterized in that the web of the adapter comprises an external-periphery-side portion having an orthogonal planar shape orthogonal to the center of the shaft, and a tapered internal-periphery-side portion that slopes to the sealing fluid side.

In accordance with the second aspect, variation in the inside diameter dimension of the first seal lip member can be suppressed without the internal peripheral side of the first seal lip member being excessively compressed to the atmosphere side by the web of the adapter, even when the internal-periphery-side portion of the web is extended inward in the radial direction to reduce the inside diameter dimension of the adapter. The first seal lip member is pressed by the adapter over wide range in the radial direction, and the movement of the first seal lip member in the axial direction can therefore be suppressed even when the shaft seal device is inserted onto the shaft.

The shaft seal device of a third aspect is the shaft seal device of the first or second aspect, and is characterized in that, in the web of the adapter, the ratio of the widths in the radial direction of the external-periphery-side portion having an orthogonal planar shape and the tapered internal-periphery-side portion is set so that the tapered internal-periphery-side portion is greater.

In accordance with the third aspect, excessive compression of the first seal lip member can be prevented even in the case that inside diameter dimension of the adapter is reduced in response to the shaft diameter and the width of the web in the radial direction is increased.

The shaft seal device of a fourth aspect is the shaft seal device of the second or third aspect, and is characterized in that an interval d in the radial direction between an internal peripheral surface of the adapter and an upper surface of a seal lip of the first seal lip member is about 0.1 mm or more and less than 1.3 mm.

In accordance with the fourth aspect, the width of the adapter in the radial direction can be maximally increased without compromising the sealing function of the seal lip, and movement of the first seal lip member in the axial direction can be suppressed even when the shaft seal device is inserted onto the shaft.

Effect of the Invention

The present invention has the following excellent effects.

(1) The adapter is annular in overall shape with a cross-sectional shape that is substantially the shape of the letter "c," and has an external peripheral flange in contact with the internal peripheral surface of the cartridge and an internal peripheral flange and web for pressing the first lip seal member. The external peripheral flange has a tapered shape that decreases in diameter toward the web side. A distal end part of the outside diameter side describes an acute angle and is formed to a diameter that is greater than the diameter of the internal peripheral surface of the cartridge, whereby the adapter can be smoothly fitted when the adapter is to be fitted to the internal peripheral surface of the cartridge. Also, when the adapter has been fitted, the adapter is less liable to dislodge from the cartridge. Therefore, the movement of the seal lip of the first lip seal member can be prevented, and sealing performance can be reliably maintained.

Furthermore, the adapter can be readily fabricated because slight dimensional variability is absorbed by elastic deformation of the external peripheral-side flange without the need to fabricate the adapter with rigorous dimensional precision.

(2) The web of the adapter is composed of an external-periphery-side portion having an orthogonal planar shape that is orthogonal to the center of the shaft, and an internal-periphery-side portion having a tapered shape that slopes to the sealing fluid side, whereby variation in the inside diameter dimension of the first seal lip member can be suppressed without the internal peripheral side of the first seal lip member being excessively compressed to the atmosphere side by the web of the adapter, even when the internal-periphery-side portion of the web is extended inward in the radial direction to reduce the inside diameter dimension of the adapter. The first seal lip member is pressed by the adapter over wide range in the radial direction, and the movement of the first seal lip member in the axial direction can therefore be suppressed even when the shaft seal device is inserted onto the shaft.

(3) In the web of the adapter, the ratio of the widths in the radial direction of the external-periphery-side portion having an orthogonal planar shape and the tapered internal-periphery-side portion is set so that the tapered internal-periphery-side portion is greater, whereby excessive compression of the first seal lip member can be prevented even in the case that inside diameter dimension of the adapter is reduced in response to the shaft diameter and the width of the web in the radial direction is increased.

(4) An interval d in the radial direction between an internal peripheral surface of the adapter and an upper surface of a seal lip of the first seal lip member is about 0.1 mm or more and less than 1.3 mm, whereby the width of the adapter in the radial direction can be maximally increased without compromising the sealing function of the seal lip, and movement of the first seal lip member in the axial direction can be suppressed even when the shaft seal device is inserted onto the shaft.

BRIEF DESCRIPTION OF THE DRAWINGS

FIG. 2 is a diagram for illustrating the adapter of the shaft seal device according to embodiment 1 of the present invention, wherein FIG. 2(a) is a front cross-sectional view of the adapter, and FIG. 2(b) is a view illustrating the state in which the adapter is press-fitted;

FIG. 4 is a diagram for illustrating the adapter of the shaft seal device according to embodiment 2 of the present invention, wherein FIG. 4(a) is a front cross-sectional view of the adapter, and FIG. 4(b) is a view illustrating the state in which the adapter is press-fitted;

FIG. 5 is a diagram for illustrating the assembled state of the shaft seal device according to a shaft seal device of prior art and the shaft seal device according to an embodiment of the present invention, wherein FIGS. 5(a) and 5(b) show the shaft seal device of prior art, and FIGS. 5(c) and 5(d) show the shaft seal device according to embodiment 2 of the present invention.

BEST MODE FOR CARRYING OUT THE INVENTION

Modes for carrying out the shaft seal device according to the present invention are described in detail below with reference to the drawings, but the present invention should not be interpreted as being limited thereby, and various modifications, changes, and improvements that do not depart from the scope of the present invention can be made on the basis of the knowledge of those skilled in the art.

[Embodiment]1

Figure 1:
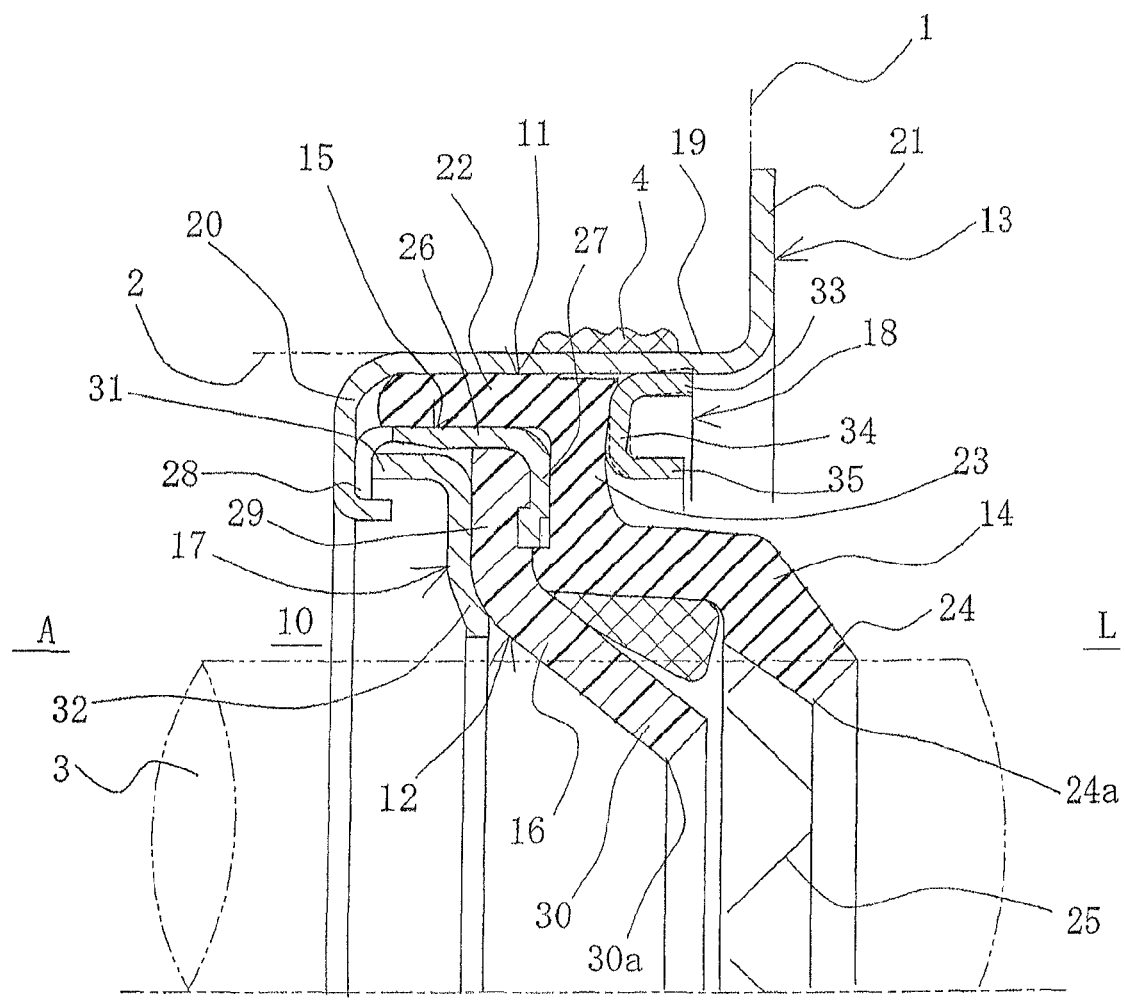
FIG. 1 is a front cross-sectional diagram showing the shaft seal device according to embodiment 1 of the present invention.

FIG. 1 is a front cross-sectional diagram showing the shaft seal device 10 according to embodiment 1 of the present invention, and the shaft seal device 10 is configured in the following manner.

The right side of the diagram is the sealing fluid side L and the left side is the atmosphere side A.

The shaft seal device 10 is mounted on the internal periphery of a shaft hole 2 of a housing 1 of a water pump or the like so as to be in slidable close contact with the peripheral surface of a shaft 3, and is provided with a two-step lip structure having a first seal lip 11 made of rubber material arranged on the sealing fluid side L, and a second seal lip 12 made of resin material arranged on the atmosphere side A.

The shaft seal device 10 has six constituent components: a cartridge 13 fitted into the internal periphery of the shaft hole 2 of the housing 1; a first seal lip member 14 made of rubber material that is fitted into and held by the cartridge 13 in a non-bonded state; a case 15 that is fitted into and held by the first seal lip member 14 in a non-bonded state; a second lip seal member 16 made of resin material that is crimped to and held in place by the case 15; a backup lip ring 17 that is similarly crimped to and held in place by the case 15 and that is arranged on the atmosphere side A of the second lip seal member 16 and used for supporting the second lip seal member 16; and an adapter 18 that is fitted into the cartridge 13 on the sealing fluid side L of the first seal lip member 14 to thereby stop the first seal lip member 14 from being dislodged from the cartridge 13.

The cartridge 13 is a pressed article made of metal, e.g., a metal plate, is molded into a ring shape overall, has a cylindrical part 19 that is fitted into the internal periphery of the shaft hole 2 of the housing 1, and is integrally formed with an inward-facing flange 20 that faces inward in the radial direction on the atmosphere side A. An outward-facing flange 21 that faces outward in the radial direction is integrally formed on the sealing fluid side L of the cylindrical part 19. The inward-facing flange 20 functions as an end wall part with which the case 15 makes contact from one of the axial directions when the shaft seal device 10 is assembled, and functions as an end wall part that sandwiches the case 15 and the first seal lip member 14 against the adapter 18 after assembly. The outward-facing flange 21 has a function for determining insertion length by coming into contact with the peripheral edge part of the opening of the shaft hole 2 of the housing 1 when the shaft seal device 10 is inserted into the shaft hole 2 of the housing 1. An external peripheral seal member 4 composed of an elastic coating for forming a sealing effect with the internal peripheral surface of the shaft hole 2 is affixed around the entire periphery of the external peripheral surface of the cylindrical part 19.

The first seal lip member 14 is composed of a predetermined rubber material (e.g., H-NBR) and has: an overall annular shape; a cylinder part 22 fitted in a non-bonded state to the internal peripheral surface of the cylindrical part 19 of the cartridge 13; a discoid part 23 that extends from the end part of the sealing fluid side L of the cylinder part 22 inward in the radial direction; and a seal lip 24 that is integrally formed from the internal peripheral-side end part of the discoid part 23 toward the sealing fluid side L. The seal lip 24 is in slidable close contact with the peripheral surface of the shaft 3 at the lip end 24a thereof, and has a threaded part 25 that creates a pumping action during shaft rotation and that is provided to the sliding surface.

The case 15 is composed of a press-machined article made of, e.g., stainless steel, is molded into a ring shape overall, is the internal peripheral side of the cylinder part 22 of the first seal lip member 14, and has: a cylindrical part 26 that is fitted between the discoid part 23 and the inward-facing flange 20 of the cartridge 13 in a non-bonded state; has a first flange 27 integrally formed from the end part of the sealing fluid side L of the cylindrical part 26 inward in the radial direction; and a second flange 28 integrally formed from the end part of the atmosphere side A of the cylindrical part 26 inward in the radial direction. The cylindrical part 26 is in close contact with the cylinder part 22 of the first seal lip member 14, the first flange 27 is in close contact with the discoid part 23, and the second flange 28 is in close contact the inward-facing flange 20 after assembly.

The second lip seal member 16 is composed of, e.g., PTFE, or another resin material, is molded into a ring shape overall, and has a discoid part 29 and a seal lip 30 integrally formed so as to slope from the end part of the internal periphery of the discoid part 29 to the sealing fluid side L. The seal lip 30 is in slidable close contact with the peripheral surface of the shaft 3 at the lip end 30a, is arranged on the atmosphere side of the first seal lip member 14, and therefore forms a secondary seal while the first seal lip member 14 forms a primary seal.

The backup lip ring 17 is composed of a press-machined article made of, e.g., stainless steel, has a ring shape overall, and has a cylinder part 31 and a flange 32 that is integrally formed from the end part of the sealing fluid side L of the cylinder part 31 inward in the radial direction. The backup lip ring 17 is arranged on the atmosphere side A of the second lip seal member 16 and supports the second lip seal member 16 from the atmosphere side A thereof.

The second lip seal member 16 and the backup lip ring 17 are crimped to and held by the case 15, as described above, and constitute the internal peripheral side of the cylindrical part 26 of the case 15. The discoid part 29 of the second lip seal member 16 and the flange 32 of the backup lip ring 17 are lined up in the axial direction between the first and second flanges 27, 28 and are crimped and secured. After crimping, the second lip seal member 16 is pressed into contact with the first flange 27 via the discoid part 29.

The adapter 18 is composed of a pressed article made of, e.g., stainless steel in similar fashion to the case 15 and the backup lip ring 17, and has: a ring shape overall with a cross-sectional shape that is substantially the shape of the letter "c;" an external peripheral-side flange 33 fitted to the internal peripheral surface of the cylindrical part 19 of the cartridge 13 on the sealing fluid side L of the cylinder part 22 of the first seal lip member 14; a web 34 integrally formed from the end part of the atmosphere side A of the external peripheral-side flange 33 inward in the radial direction; and an internal peripheral-side flange 35 that is curved toward the sealing fluid side L and formed from the end part of the internal peripheral side of the web 34. The adapter 18 presses the first seal lip member 14 toward the atmosphere side via the web 34, retains the web, and stabilizes the orientation.

Figure 2:
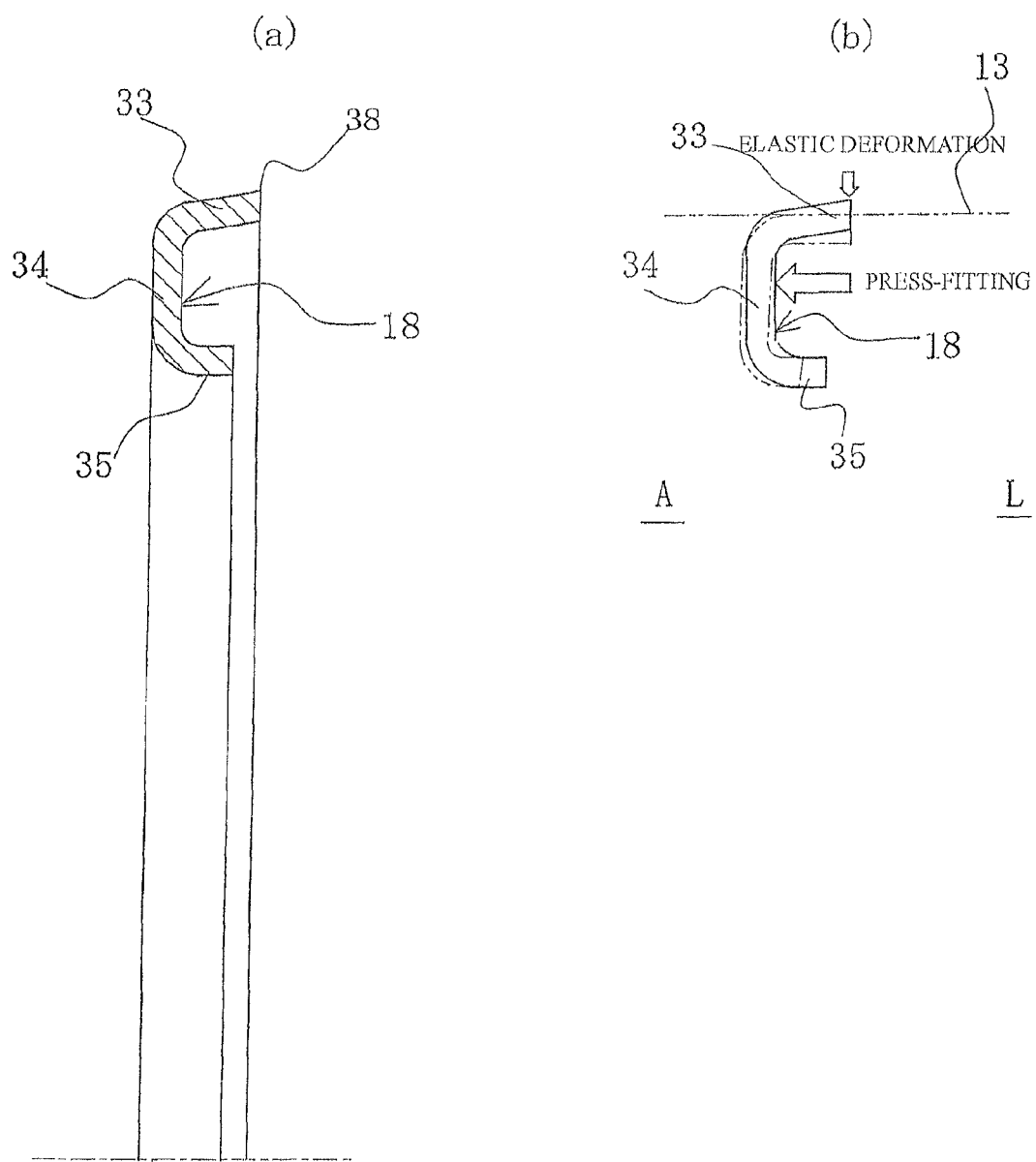

FIG. 2 is a diagram for illustrating the adapter 18 of the shaft seal device according to embodiment 1 of the present invention, wherein FIG. 2(a) is a front cross-sectional view of the adapter 18, and FIG. 2(b) is a view illustrating the state in which the adapter 18 is press-fitted. The adapter 18 has a ring shape overall with a cross-sectional shape that is substantially the shape of the letter "c," as shown in FIG. 2(a), and has an external peripheral-side flange 33 in contact with the internal peripheral surface of the cartridge 13 and a web 34 and internal peripheral-side flange 35 that press the first seal lip member 14. The external peripheral-side flange 33 has a tapered shape that decreases in diameter toward the web side. The external diameter-side distal end part 38 describes an acute angle and is formed to a diameter that is greater than the diameter of the internal peripheral surface of the cylindrical part 19 of the cartridge 13.

When the adapter 18 is press-fitted to the internal peripheral surface of the cartridge 13, the adapter can be smoothly fitted because the external peripheral-side flange 33 has a tapered shape, as shown in FIG. 2(*b*). Since the external diameter-side distal end part 38 describes an acute angle and is formed to a diameter that is greater than the diameter of the internal peripheral surface of the cylindrical part 19 of the cartridge 13, the adapter 18 is press-fitted while the external peripheral-side flange 33 elastically deforms inward in the manner indicated by the alternate long and two short dashes line. Accordingly, the web 34 also slopes slightly to the atmosphere side A, as indicated by the alternate long and two short dashes line.

In FIG. 1, the shape of the adapter 18 prior to press-fitting is indicated by a broken line, and the shape of the adapter 18 after press-fitting is indicated by the solid line.

After the adapter 18 has been press-fitted, the external diameter-side distal end part 38 bites into the internal peripheral surface of the cartridge 13 because the external peripheral-side flange 33 attempts to return to its original shape. Therefore, the adapter 18 is unlikely to dislodge after having been fitted.

The internal peripheral-side flange 35 doubly functions to improve the strength of the adapter 18 and to prevent damage to the first seal lip member 14, and may have a curvilinear shape smoothly curved from the internal peripheral side of the web 34, e.g., an arcuately curved part.

[Embodiment]2

Figure 3:
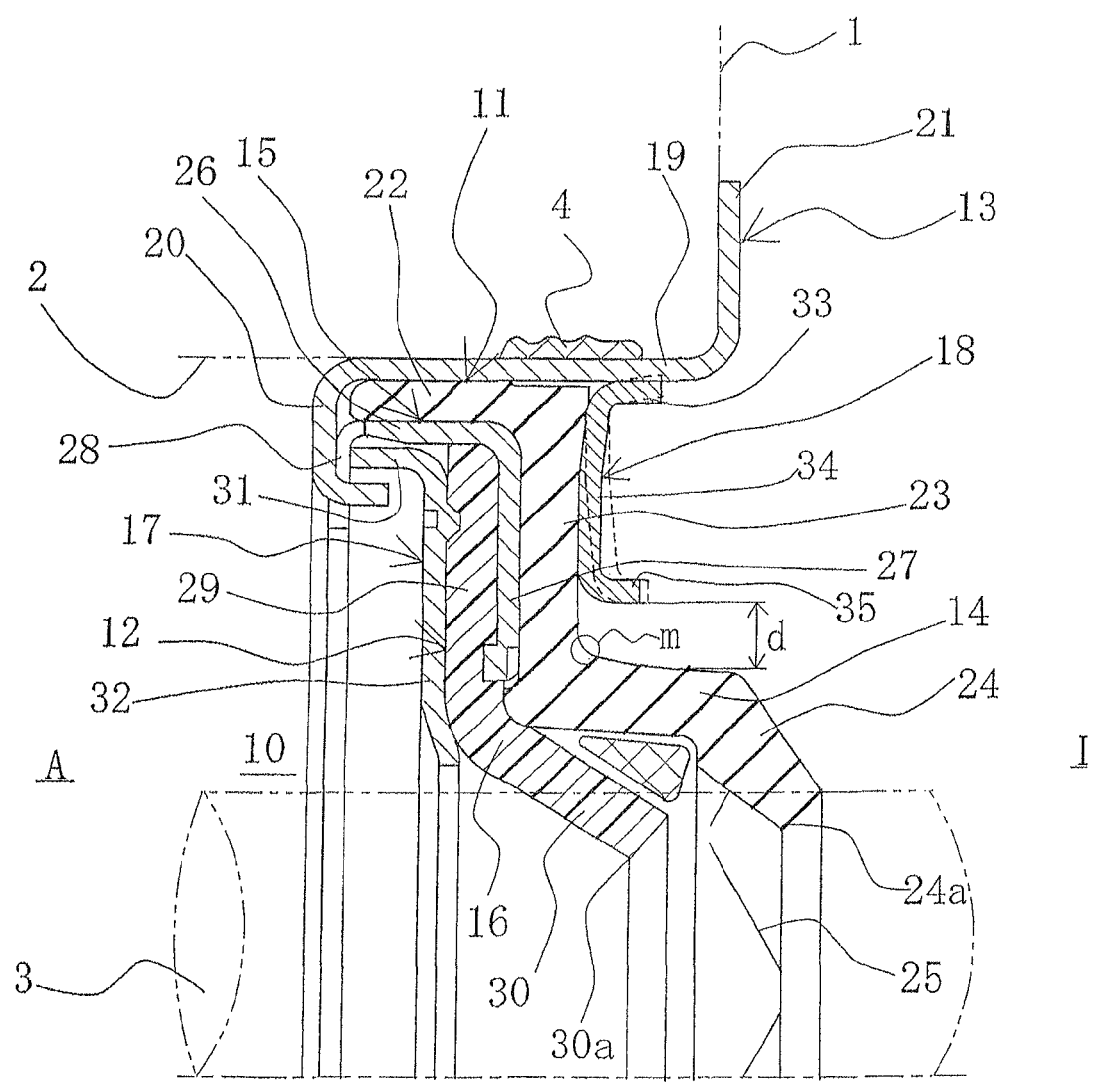
FIG. 3 is a front cross-sectional diagram showing the shaft seal device according to embodiment 2 of the present invention.

FIG. 3 is a front cross-sectional diagram showing the shaft seal device 10 according to embodiment 2 of the present invention. In the shaft seal device 10 according to embodiment 2, the shaft 3 has a smaller diameter than the shaft 3 of embodiment 1. Therefore, the five constituent components: the first seal lip member 14, the case 15, the second lip seal member 16, the backup lip ring 17, and the adapter 18, are different from embodiment 1 in terms of the shape that corresponds to the smaller diameter shaft 3. Accordingly, the same reference numerals are used for the same members that correspond to embodiment 1, and except for the points of difference, a detailed description thereof will be omitted.

In the shaft seal device 10 according to embodiment 2, the inside diameter dimension of the first seal lip member 14, the case 15, the second lip seal member 16, and the backup lip ring 17 must be reduced in comparison with embodiment 1, as shown in FIG. 3. Therefore, the width in the radial direction of the discoid part 23 of the first seal lip member 14, the first flange 27 of the case 15, the discoid part 29 of the second lip seal member 16, and the flange 32 of the backup lip ring 17 is formed with greater width in the radial direction.

Accordingly, the adapter 18 is also formed with a reduced inside diameter dimension.

The adapter 18 has a ring shape overall with a cross-sectional shape that is substantially the shape of the letter "c," and an external peripheral-side flange 33 fitted to the internal peripheral surface of the cylindrical part 19 of the cartridge 13 on the sealing fluid side L of the cylinder part 22 of the first seal lip member 14. A web 34 is integrally formed from the end part of the atmosphere side A of the external peripheral-side flange 33 inward in the radial direction, and an internal peripheral-side flange 35 is curved toward the sealing fluid side L and formed from the end part of the internal peripheral side of the web 34. The adapter 18 presses the first seal lip member 14 toward the atmosphere side via the web 34, retains the web, and stabilizes the orientation. The internal peripheral side of the web 34 extends inward in the radial direction to a point proximate to the intersection m between the seal lip 24 and the discoid part 23 of the first seal lip member 14 so that the function of the web can be sufficiently demonstrated.

Figure 4:
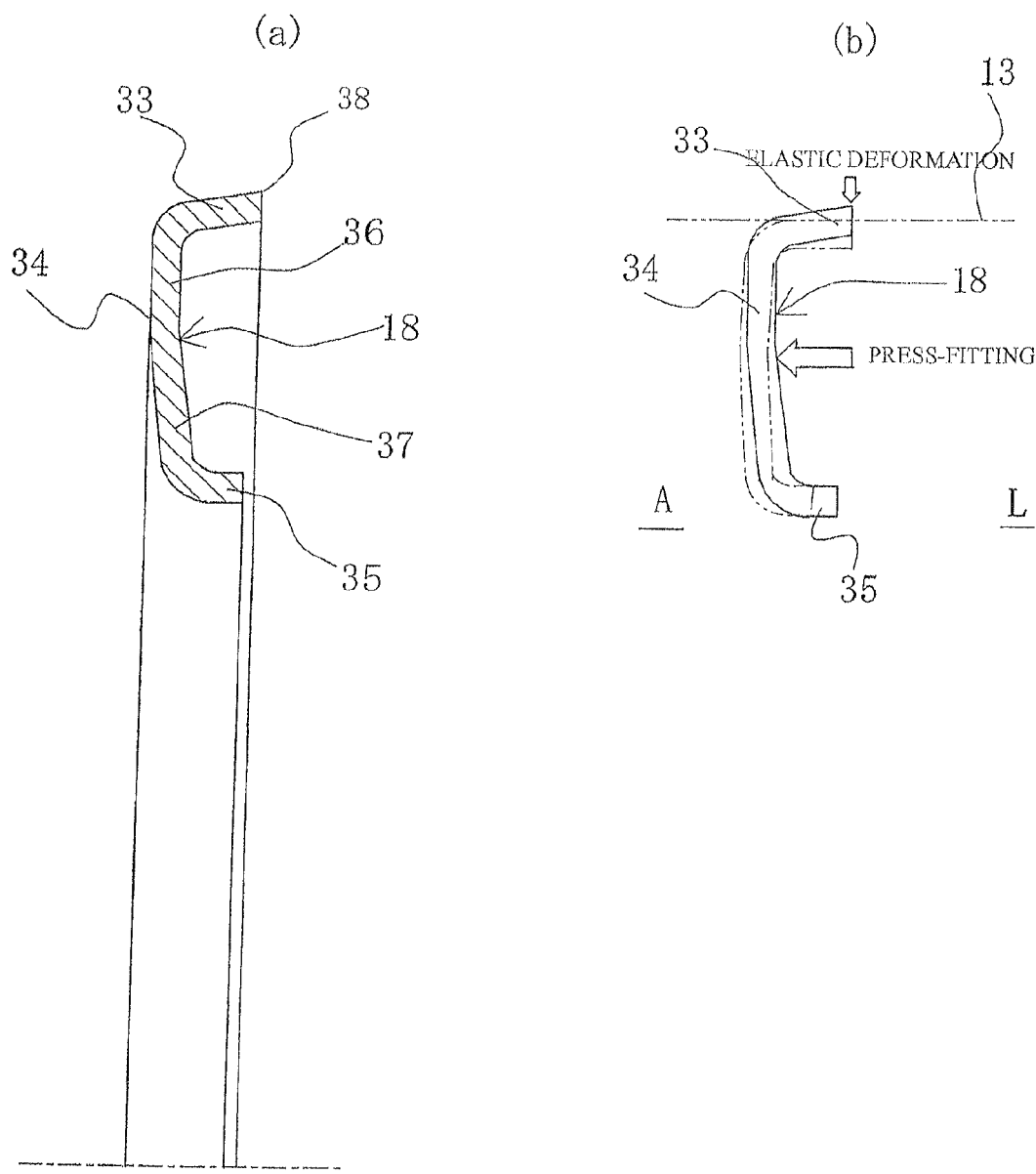

FIG. 4 is a diagram for illustrating the adapter 18 of the shaft seal device according to an embodiment of the present invention, wherein FIG. 4(*a*) is a front cross-sectional view of the adapter 18, and FIG. 4(*b*) is a view illustrating the state in which the adapter 18 is press-fitted. The adapter 18 has a ring shape overall with a cross-sectional shape that is substantially the shape of the letter "c," as shown in FIG. 4(*a*), and has an external peripheral-side flange 33 in contact with the internal peripheral surface of the cartridge 13 and a web 34 and internal peripheral-side flange 35 that press the first seal lip member 14. The external peripheral-side flange 33 has a tapered shape that decreases in diameter toward the web 34 side. The external diameter-side distal end part 38 describes an acute angle and is formed to a diameter that is greater than the diameter of the internal peripheral surface of the cylindrical part 19 of the cartridge 13.

When the adapter 18 is press-fitted into the cartridge 13, the external peripheral-side flange 33 of the adapter elastically deforms inward in the radial direction from the state indicated by the solid line to the state indicated by the alternate long and two short dashes line, as shown in FIG. 4(*b*), and therefore, the inner side of the web 34 in the radial direction also slopes slightly to the atmosphere side A. Accordingly, when the inside diameter of the adapter 18 is simplistically reduced and the width in the radial direction is increased, the internal peripheral side of the first seal lip member 14 is compressed by a considerable distance to the atmosphere side by the web 34 of the adapter 18, the inside diameter dimension of the first seal lip member 14 varies, and seal function is negatively affected. Therefore, the width of the adapter 18 in the radial direction cannot be increased.

In view of this fact, in embodiment 2, the web 34 of the adapter 18 is formed from an external-periphery-side portion 36 having an orthogonal planar shape that is orthogonal to the center of the shaft, and a internal-periphery-side portion 37 that slopes to the sealing fluid side, as shown in FIG. 4(*a*), whereby the internal peripheral side of the web 34 can extend inward in the radial direction to a point proximate to the intersection m between the seal lip 24 and the discoid part 23 of the first seal lip member 14. In other words, even when the internal peripheral side of the web 34 extends inward in the radial direction, the internal peripheral side of the web 34 is set so as to be in a substantially vertical state even when the web 34 slopes to the atmosphere side A when the adapter 18 is press-fitted into the cartridge 13, because the internal-periphery-side portion 37 is formed having a tapered shape that slopes to the sealing fluid side. Therefore, it is possible to prevent the internal peripheral side of the first seal lip member 14 from being excessively compressed to the atmosphere side and to suppress variation in the inside diameter dimension of the first seal lip member 14.

The angle of the taper of the internal-periphery-side portion 37 is determined by design, and in the present embodiment, the angle is 4° to 8°, and is preferably about 6°.

The ratio of the widths in the radial direction of the external-periphery-side portion 36 having an orthogonal planar shape and the internal-periphery-side portion 37 having a tapered shape is preferably set so that the tapered internal-periphery-side portion 37 is greater in the web 34 of the adapter 18. Furthermore, in FIG. 3, an interval d in the radial direction between an internal periphery of the adapter 18 and an upper surface of a seal lip 24 of the first seal lip member 14 is preferably about 0.1 mm or more and less than 1.3 mm on one side.

With the web 34 of the adapter 18 formed in this manner, the internal peripheral side of the first seal lip member 14 is prevented from being excessively compressed to the atmosphere side by the web 34 of the adapter 18 and it is possible to suppress variation in the inside diameter dimension of the first seal lip member 14, even when the inside diameter dimension of the adapter 18 is reduced and the width of the web 34 in the radial direction is increased. Also, movement of the first seal lip member 14 in the axial direction can be suppressed even when the shaft seal device is inserted onto the shaft 3.

Figure 5:
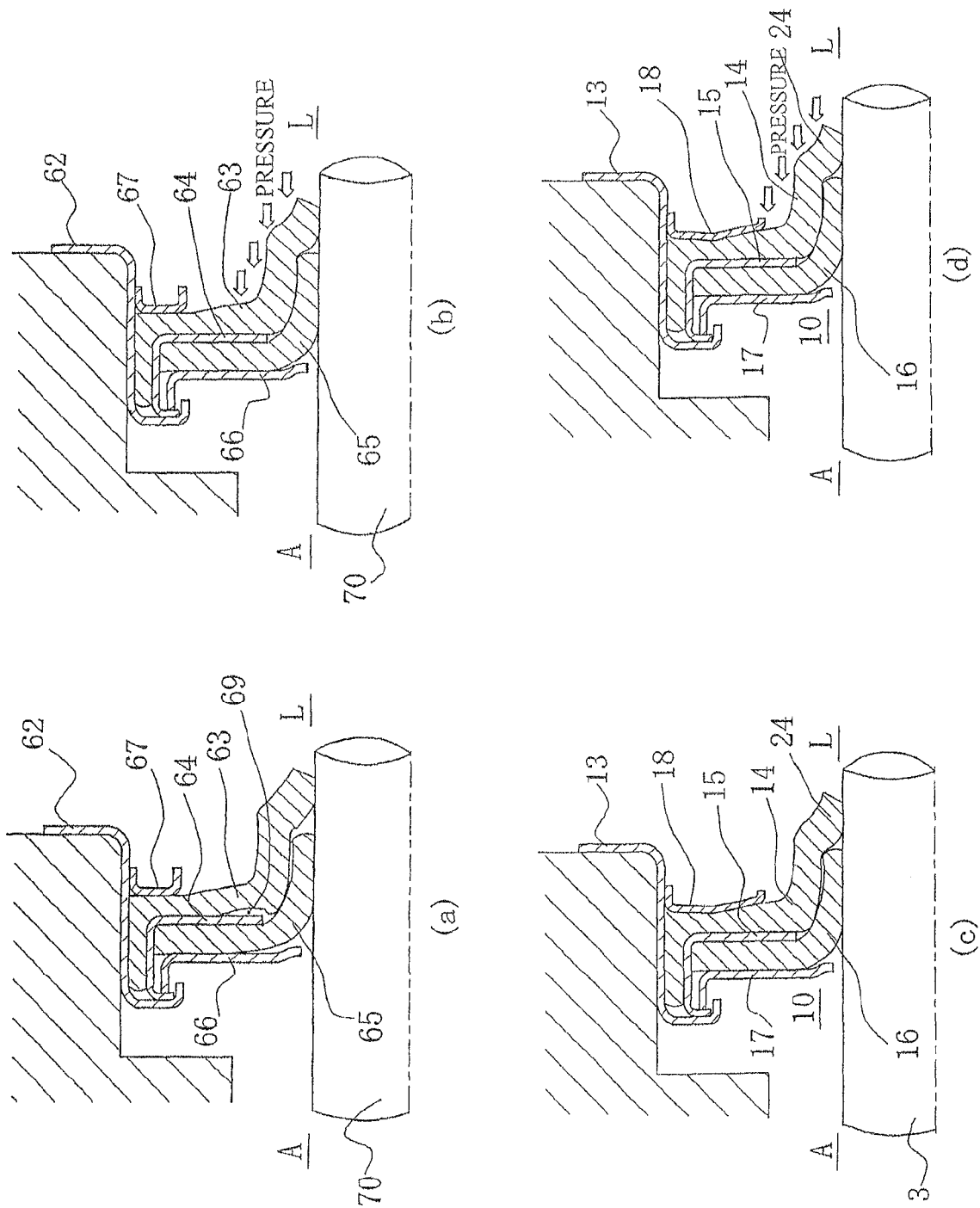
Figure 6:
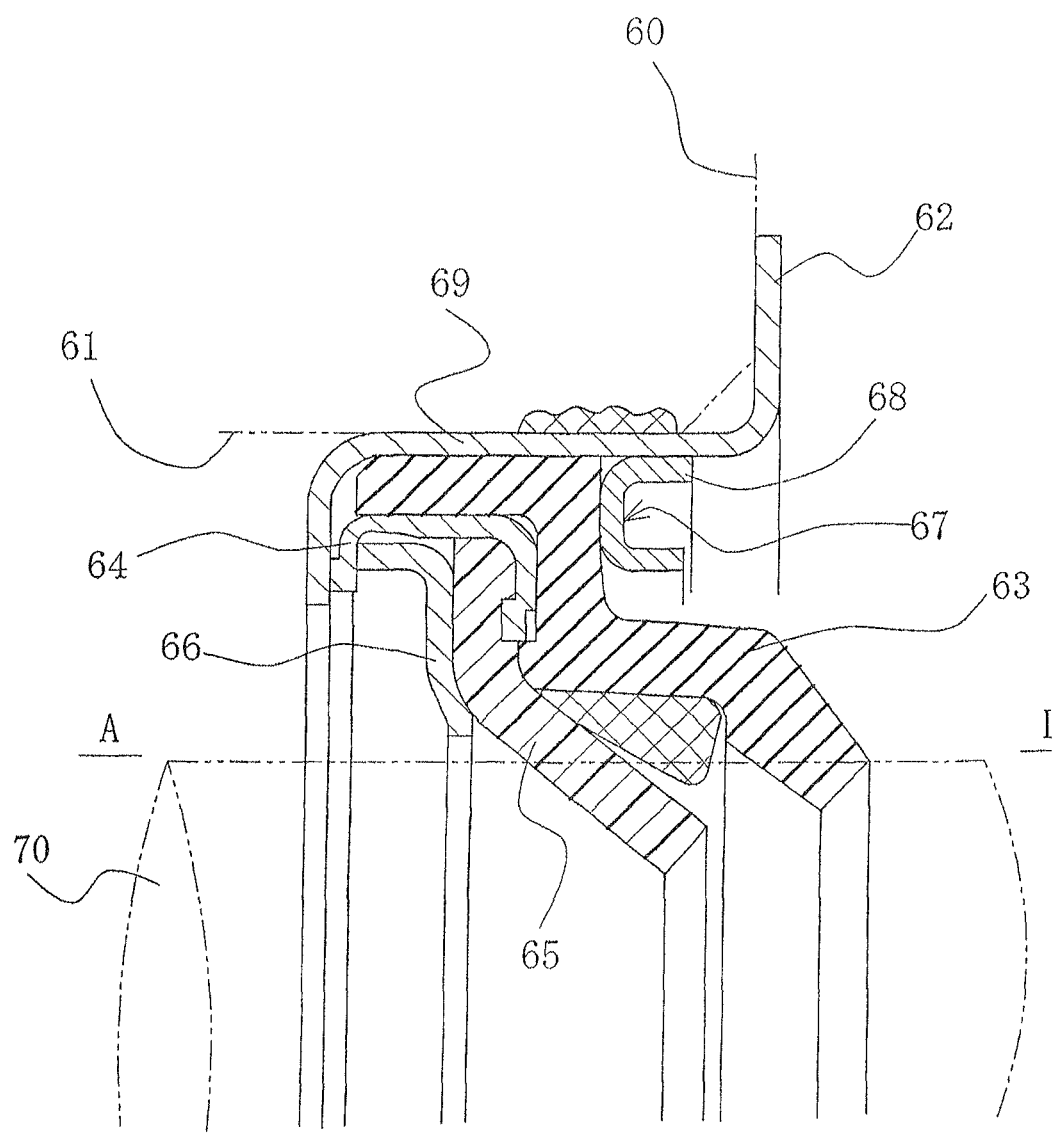
FIG. 6 is a front cross-sectional view showing a shaft seal device of prior art.

FIGS. 5(c) and 5(d) are diagrams for illustrating the assembled state of the shaft seal device 10 according to embodiment 2. In FIG. 5(c) showing the state in which the shaft seal device 10 has been assembled on the shaft 3, a large portion of the discoid part 23 of the first seal lip member 14 is pressed by the adapter 18. Therefore, the seal lip 24 does not move, a state of contact is maintained between the first seal lip member 14 and the case 15, and the state is substantially the same as that prior to assembly. In contrast, in the shaft seal device of the prior art of FIG. 5(a), a gap 69 is formed between the first seal lip 63 and the case 64, and it is apparent that the first seal lip 63 has moved due to assembly on the shaft 70.

On the other hand, it is apparent that the state in which system pressure is applied to the sealing fluid side L in FIG. 5(d) is substantially the same state as that of FIG. 5(c). In other words, since the first seal lip member 14 and the case 15 are in a state of contact prior to system pressure being applied, the seal lip 24 substantially does not move even though the seal lip 24 of the first seal lip member 14 is pressed against the seal lip 30 of the second lip seal member 16 when system pressure is applied.

As described above, the adapter according to the present invention is readily fitted and unlikely to dislodge because an external peripheral-side flange has a tapered shape, an external diameter-side distal end part describing an acute angle and having a diameter that is greater than the diameter of the internal peripheral surface of the cartridge. Also, excessive compression of the first seal lip member is prevented and variation in the inside diameter dimension of the first seal lip member can be suppressed even when inside diameter dimension of the adapter is reduced and the width of the web is increased in the radial direction, because the web is formed from an external-periphery-side portion having an orthogonal planar shape that is orthogonal to the center of the shaft, and a tapered internal-periphery-side portion that slopes to the sealing fluid side. It is furthermore possible to press a large portion of the first seal lip member to the sealing fluid side. Therefore, movement of the first seal lip member in the axial direction can be suppressed even when the shaft seal device is inserted onto the shaft.

KEY TO THE SYMBOLS 1 housing
2 shaft hole
3 shaft
4 external peripheral seal member
10 shaft seal device
11 first seal lip
12 second seal lip
13 cartridge
14 first seal lip member
15 case
16 second lip seal member
17 backup lip ring
18 adapter
19 cylindrical part
20 inward-facing flange
21 outward-facing flange
22 cylinder part
23 discoid part
24 seal lip
25 threaded part
26 cylindrical part
27 first flange
28 second flange
29 discoid part
30 seal lip
31 cylinder part
32 flange
33 external peripheral-side flange
34 web
35 internal peripheral-side flange
36 external-periphery-side portion
37 internal-periphery-side portion
38 external diameter-side distal end part
L sealing fluid side
A atmosphere side

The invention claimed is:

1. A shaft seal device for sealing a space between a housing and a rotating shaft, the shaft seal device comprising:
a cartridge fitted into the internal periphery of a shaft hole of said housing;
a first lip seal member fitted in a non-bonded state to said cartridge;
a case fitted in a non-bonded state to said first lip seal member;
a second lip seal member crimped onto and held by said case, and a backup ring for supporting the second lip seal member; and
an adapter fitted into said cartridge on a sealing fluid side of said first lip seal member,
wherein said adapter is annular in overall shape with a cross-sectional shape that is substantially the shape of the letter "c" and has an external peripheral flange in contact with an internal peripheral surface of said cartridge and an internal peripheral flange and web for pressing said first lip seal member;
said external peripheral flange has a tapered shape that decreases in diameter toward said web side, a distal end part of the outside diameter side describing an acute angle, and being formed to a diameter that is greater than the diameter of the internal peripheral surface of said cartridge; and
said web of said adapter comprises an external-periphery-side portion having an orthogonal planar shape orthogonal to the center of the shaft, and a tapered internal-periphery-side portion that slopes to the sealing fluid side.

2. The shaft seal device according to claim 1, characterized in that an interval d in the radial direction between an internal peripheral surface of said adapter and an upper surface of a seal lip of the first seal lip member is about 0.1 mm or more and less than 1.3 mm.

3. The shaft seal device according to claim 1, characterized in that, in said web of said adapter, the ratio of the widths in the radial direction of the external-periphery-side portion having an orthogonal planar shape and the tapered internalperiphery-side portion is set so that the tapered internal-periphery-side portion is greater.

4. The shaft seal device according to claim 3, characterized in that an interval d in the radial direction between an internal peripheral surface of said adapter and an upper surface of a seal lip of the first seal lip member is about 0.1 mm or more and less than 1.3 mm.

* * * * *